(12) United States Patent
Ballard et al.

(10) Patent No.: US 8,567,259 B1
(45) Date of Patent: Oct. 29, 2013

(54) OPTICAL PHASE SHIFT FLUID FLOW VELOCITY MEASUREMENT MECHANISM

(75) Inventors: Glenn W Ballard, Albuquerque, NM (US); Peter Vorobieff, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 391 days.

(21) Appl. No.: 13/025,031

(22) Filed: Feb. 10, 2011

Related U.S. Application Data

(60) Provisional application No. 61/337,592, filed on Feb. 10, 2010.

(51) Int. Cl.
*G01F 1/32* (2006.01)
(52) U.S. Cl.
USPC ............................................ 73/861.22; 356/28
(58) Field of Classification Search
None
See application file for complete search history.

(56) References Cited

U.S. PATENT DOCUMENTS

| | | | | |
|---|---|---|---|---|
| 2,813,424 | A | * 11/1957 | Liepmann et al. | 73/861.22 |
| 4,241,612 | A | * 12/1980 | Williamson | 73/861.22 |
| 5,736,647 | A | 4/1998 | Matsubara et al. | |
| 6,351,999 | B1 | * 3/2002 | Maul et al. | 73/861.22 |
| 7,258,024 | B2 | 8/2007 | Dimarco et al. | |
| 7,444,885 | B2 | 11/2008 | Keese et al. | |

* cited by examiner

*Primary Examiner* — Harshad R Patel
(74) *Attorney, Agent, or Firm* — Gonzales Patent Services; Ellen Gonzales

(57) ABSTRACT

An optical shift fluid flow velocity measurement mechanism is shown and described. A fluid flows over a bluff body to produce a vortex street. Downstream of the bluff body a light beam emission source directs a beam of light towards a lenslet including a light transmission gradient. Light transmitted through the lenslet is perceived by a photovoltaic cell which generates an electrical signal. Vortices in the vortex stream disrupt the light beam, affecting the amount of light transmitted through the lenslet and perceived by the photovoltaic cell, thereby changing the electrical signal. The frequency of the changes in the electrical signal can then be correlated to the velocity of the fluid flow.

17 Claims, 2 Drawing Sheets

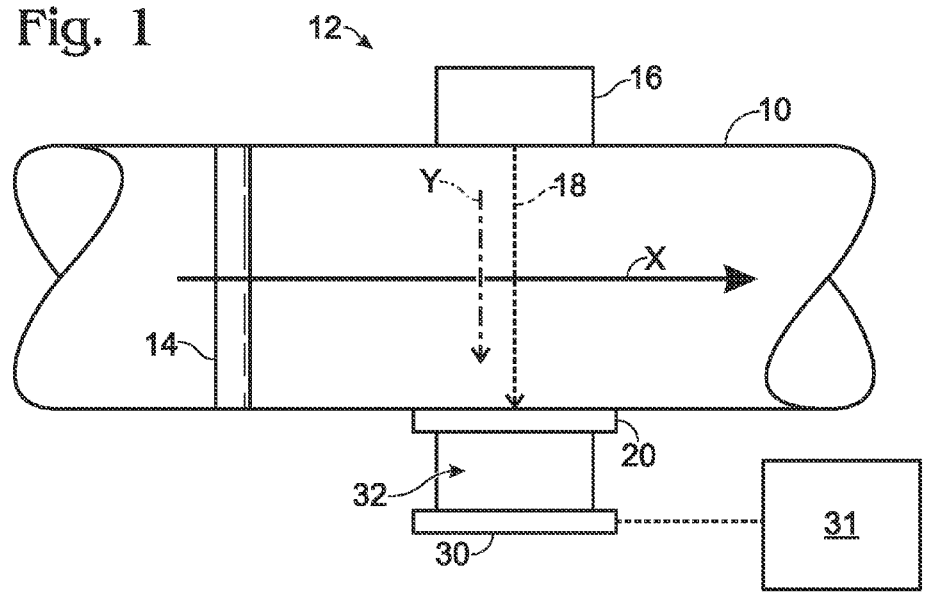
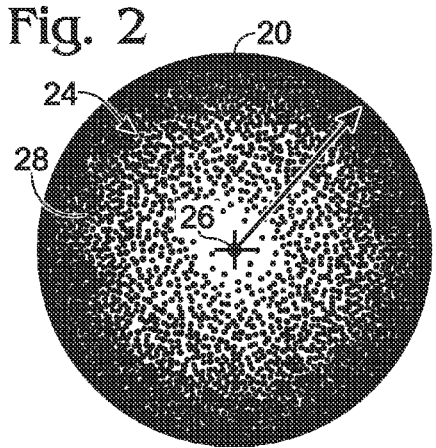
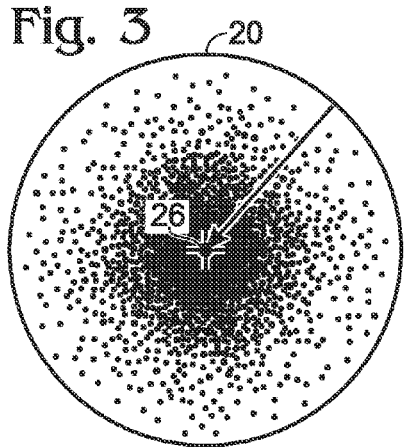
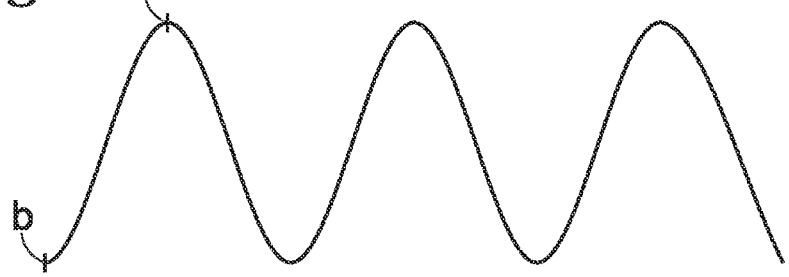

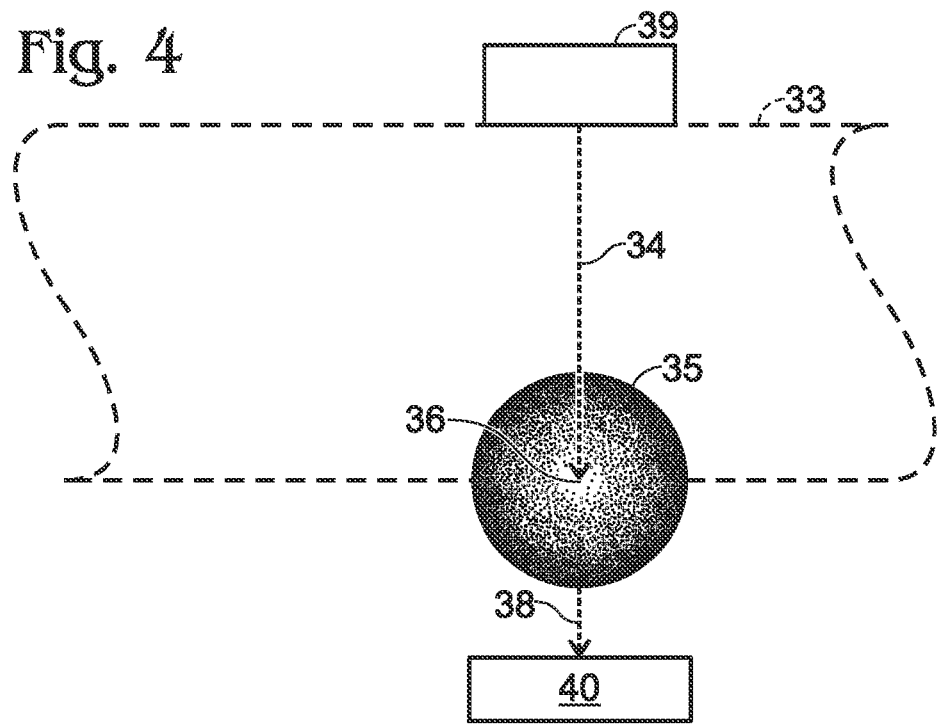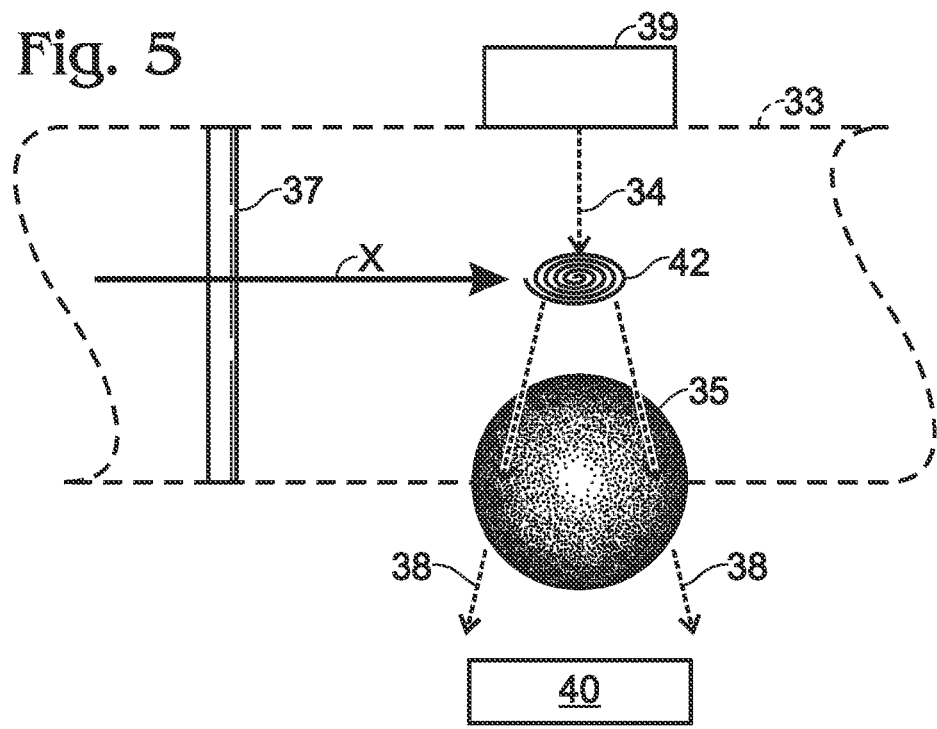

US 8,567,259 B1

OPTICAL PHASE SHIFT FLUID FLOW VELOCITY MEASUREMENT MECHANISM

CROSS-REFERENCE TO RELATED APPLICATIONS

The following application claims benefit of U.S. Provisional Application No. 61/337,592, filed Feb. 10, 2011, which is hereby incorporated by reference in its entirety.

BACKGROUND

The present disclosure relates to fluid flow measurement systems. Measuring the velocity of fluid flows is essential for countless applications, many of which including those in the gas, oil, and nuclear fields, require systems which can be used in highly corrosive environments and which have minimal maintenance requirements.

Previously described methods of measuring fluid flow include pressure-based systems that restrict fluid flow in order to measure its rate from the resulting pressure difference, or mechanical methods that rely on a moving mechanical apparatus (e.g. a pinwheel, rotor, or the like) placed in the fluid stream. Other previously described methods include vortex flow meters, wherein a bluff body is placed in the path of the fluid. Vortices are created as the fluid passes the bluff body. The vortices trail behind the bluff body and the frequency of the vortex shedding off the bluff body is detected, often via a piezoelectric crystal or other sensor, which produces a small, but measurable, voltage pulse each time a vortex is created. The frequency of the pulse is measured and the fluid flow velocity is calculated by $V=fL/S$ where f is the frequency, L is the characteristic length of the bluff body. And S is the Strouhal number, which is essentially a constant for a given body shape within its operational limits. Still further methods of measuring flow rates include optical flow meters which typically measure the actual speed of particles in the fluid flow. In this instance small particles in the fluid pass through two laser beams spaced a known distance apart from each other. A signal is generated when a particle passes through the first laser beam and a second signal is generated when the same particle passes through the second laser beam. Fluid flow velocity is calculated by $V=D/T$ where D is the distance between the laser beams and T is the interval between the generation of the first and second signals. All of these existing methods have limitations. Restriction of the flow rate can be detrimental to a given system or process, while mechanical flow measurement devices are sometimes less restrictive to the flow itself, but their moving parts can fail. Previously described vortex flow meters may rely on expensive sensors and electronics that may be destroyed is corrosive environments and previously described optical flow meters that rely on the ability to detect the same particle passing through different laser beams may be expensive or impractical in various environments. Accordingly, there remains a need for inexpensive fluid flow measurement systems which can be used in chemically harsh environments and which require minimal to no maintenance.

SUMMARY

The present disclosure provides a novel flowmeter that employs a bluff body and a light beam directed across, and generally perpendicular to, the fluid flow, wherein the focal point of the light beam shifts in response to periodic disturbances in the flow created by the bluff body and wherein an electronic signal is generated in response to the shifting movement of the focal point of the light beam.

BRIEF DESCRIPTION OF THE DRAWINGS

FIG. 1 is a side-view schematic of an electro-optical flowmeter according to an embodiment of the present disclosure.

FIG. 2 is a schematic of a lenslet suitable for use with the flowmeter of FIG. 1.

FIG. 3 is a schematic of another lenslet suitable for use with the flowmeter of FIG. 1.

FIG. 4 illustrates the effect of the light beam when its path is not disrupted by a vortex.

FIG. 5 illustrates the effect of the light beam when its path is disrupted by a vortex.

FIG. 6 is an exemplary wave pattern that could be produced by an embodiment of the presently described flowmeter.

DETAILED DESCRIPTION

According to an embodiment the present disclosure provides an inexpensive, solid state flowmeter that can be completely sealed so that it is suitable for use in a chemically harsh environment. Turning to FIG. 1, a side-view schematic of an exemplary flowmeter is shown. In FIG. 1, fluid flows in the x-direction through conduit 10. It should be understood that conduit 10 may take the form of a channel, pipe, or any other suitable body through which fluid can flow. Flowmeter 12 includes a bluff body 14. It will be understood that bluff body 14 may take the form of any shape for which velocity data is known or calculable and which produces a vortex street within the fluid stream (e.g., an elliptic cylinder instead of a circular one). According to a specific embodiment, bluff body 14 takes the form a cylinder, though it can likewise take almost any other shape with a defined width. Velocity data for flow around cylinders is well-established and freely available. Specifically, it is known that a pattern of counter-rotating vortices (the Benard-von Karman wake) emerges behind a bluff body and persists for a wide range of freestream flow velocities, with the Strouhal number (the vortex shedding frequency nondimensionalized by the bluff body diameter and freestream velocity) remaining nearly constant through a large part of that range. According to some embodiments, it may be desirable for bluff body or cylinder 14 to be heated. Heating the bluff body can increase refractability without adding significant costs or moving parts to the system. In general, the less compressible the medium being measured, the more desirable it may be to heat the bluff body. Methods for heating the bluff body include electrical heating or heating via circulation of warm fluid through channels inside the body.

Downstream of bluff body 14, flowmeter 12 further includes a light beam emission source 16, which is configured to direct a beam of light 18 across (that is perpendicular to) the direction of fluid flow. (In the schematic the direction of the light beam is shown as direction Y.) According to a specific embodiment, the light beam emission source 16 is an inexpensive laser diode. Recent innovations in laser diode technology have dramatically decreased the costs and space requirements associated with light beam emission, making them both cost-effective and practical for commercial field applications.

Regardless of its source, light beam 18 is directed at lenslet 20, which is situated across the fluid flow path from light beam emission source 16 such that fluid traveling through conduit 10 passes through light beam 18. FIG. 2 is an isolated view of lenslet 20. It will be seen that lenslet 20 includes distinctive radial tint, or gradient of emissivity. Specifically, lenset 20 is designed to include an outwardly radiating circular light transmission gradient 24. According to an embodiment, the gradient is such that the center 26 of the gradient is absolutely opaque (that is absolutely no light in the wavelength of light beam 18 is transmitted through the center most portion of the lenslet) and the outer portion 28 of the gradient is absolutely clear (that is maximum light in the wavelength of light beam 18 is transmitted through the lenslet). It should be appreciated that according to some embodiments, the gradient may be reversed, that is the center of the gradient may be absolutely clear and the outer portion of the gradient may be absolutely opaque, as shown in FIG. 3. According to some embodiments a smoothly linear gradient may be used. However, in an alternate embodiment, a stepped gradient may be used, with the size of the steps being inversely related to signal resolution.

For the purposes of the present disclosure it will be noted that the center of the gradient may or may not be placed at the actual physical center of the lenslet. Typically, however, any area outside of the gradient circle should be coherent with the outer edge of the gradient. For example, if the gradient extends from a clear center to an opaque outer portion, then the portion of the lenslet outside of the gradient circle should also be opaque.

Lenslet 20 may be formed of any suitable material capable of producing a light transmission gradient including, but not limited to, plastic, glass, or any material that is translucent to the given wavelength of light. Suitable methods for applying a light transmission gradient to the lenslet include, but are not limited to molded or machined semi-opaque materials, plating, sputtering, films, or dispersions applied as coatings.

Returning to FIG. 1, it can be seen that behind lenslet 20 is a signal generator 30 configured to respond to fluctuations in light transmission through lenslet 20 and produce a detectable signal. According to a specific embodiment, signal generator 30 is a photovoltaic cell. The photovoltaic cell may be any suitable photovoltaic cell including those commonly commercially available from silicon, gallium arsenide, amorphous, gels, films, or any other materials that convert light into electrical energy.

In some embodiments it may be desirable to include a diffusion medium 32 between the signal generator 30 and the lenslet 20 in order to spread out the point of light beam 18, so that its light can be more easily absorbed and converted into electricity without, for example, burning the photovoltaic cell. Suitable diffusion mediums include, but are not limited to agar, polyacrylamide gel, a stack of plastic or glass sandblasted lenses, or any other translucent material manufactured, cast, formed, machined, or shaped with reflective or refractive inclusions.

Signal generator 30 is in electronic communication with an electronic mechanism 31, which may be, for example, an oscilloscope or other apparatus configured to detect the signal produced by signal generator 30 and display it in an observable format, a digital signal processor (DSP), or any other analog wave receiver such as a computer. The system may further include additional displays and/or other instrumentation suitable for the intended use of the flow meter including, for example, a computer or other control system.

While the embodiment shown in FIG. 1 provides a flowmeter that is used within a confined channel or the like, it should be appreciated that the flowmeter of the present disclosure can be used on a vehicle or other body traveling in a free stream flow or across which a free stream flows. For example, the presently described flowmeter could be used instead of or in addition to the pitot tube that is traditionally used on aircrafts. In this embodiment, one end of the flowmeter (e.g. the light beam emission source or "sender") might be located on the surface of the vehicle and oriented so as to direct a beam of light to the "receiver" (e.g. the lenslet and diode, with or without a diffusion medium) which is located some distance away from the surface of the vehicle (or vice versa). According to one embodiment, the bluff body could form some, none, or all of the physical structure used to position the sender or the receiver away from the vehicle. For example, the bluff body could extend perpendicularly away from the surface of the vehicle. The distal end of the bluff body could then include or otherwise form some type of attachment and/or positioning device for the sender or receiver. Alternatively, a positioning device other than the bluff body could otherwise be supported downstream of the measurement instrument. An advantage to using the flowmeter described herein instead of, or in addition to, a pitot tube is that the currently described flowmeter would be more resistant to icing than the pitot tube. Furthermore, characteristic signatures in the signal produced by the presently described flowmeter could alert crews to the presence of icing conditions that might affect the readings produced by the pitot tube.

As shown in FIGS. 4-6, the periodic disturbances created by the bluff body change the aim of the focal point of the light beam with respect to the light transmission gradient on the lenslet. The light transmission gradient, in turn, effects the amount of light that is transmitted through the lenslet and captured by the signal generator, which as explained above, may be, for example, a photovoltaic cell. Referring to FIGS. 4 and 5, it can be seen that in this exemplary embodiment, laser source 39 aims laser beam 34 such that it will hit the clear center 36 on lenslet 35 when the laser beam is unperturbed by any disturbances in the air flow (e.g., when the fluid flow velocity is zero or if the bluff body is removed) (FIG. 4). According to some embodiments, the diode may be adjusted, using known means, so that it can be tuned to different materials/fluids etc. When the laser beam is unperturbed by any disturbances in the air flow, all the light from laser beam 34 is transmitted through the clear portion of the lenslet so that it hits photovoltaic cell 40. When fluid starts flowing in the x direction through conduit 33 (if present), the cyclical shedding of vortices 42 behind the bluff body 37 causes refraction phase shift of laser beam 34 away from the center of the lenslet (FIG. 5), moving the beam intermittently into the tinted region of the gradient, and thereby reducing the amount of light that passes through the lenslet, causing the electrical current generated by photovoltaic cell 40 to fluctuate in a wave pattern (FIG. 6) consistent with the vortex shedding frequency, which, in turn, correlates to fluid flow velocity. In FIG. 6, point "a" shows with highest current generation by the photovoltaic cell, which corresponds to a period of high light beam transmission through the lenslet, which, in turn, correlates with the time period between vortices. Conversely, point "b" shows the lowest current generation by the photovoltaic cell, corresponding to a period when the light beam was most refracted and least transmitted through the lenslet, thereby indicating the presence of a vortex between the light beam source and the lenslet.

The refraction phase shift is caused by density fluctuations in the wake, which are due to pressure variations (low pressure being associated with vortex cores) or pressure variations combined with buoyancy effects (due to heated cylinder). It will be noted that, if desired, the properties (wavelength, intensity, etc.) of light beam 18 may be selected to match the optical properties of the medium (such as preferential pass-through wavelength).

Furthermore, once a baseline signal is determined, changes in the signal (e.g. alterations in the wave shapes such as peaking, shifting, or loss of amplitude) may indicate changing conditions within the system such as contamination, plaque buildup, temperature changes or the like.

It will be appreciated that the various embodiments of the flowmeter described herein contains no moving parts. Furthermore, there is no need for the detector or other electronic parts to make contact with the fluid flow. Accordingly, the system described herein is particularly useful and relevant for highly caustic or harsh environments. Furthermore, the parts used in the present detector tend to be long lived, substantially reducing the need for maintenance. In general, the two lifespan limiting factors for the system is the life span of the laser beam generator and contamination of the lenslet. However, if contamination occurs at a known rate, even this can be accounted for in the velocity calculation.

The low cost of the presently described flowmeters allow for multiple flowmeters to be used in series, while the long vortex street following a single bluff body allows that multiple sensor arrays may be used in series to form a single complex meter, where one or more of these arrays may be operated at any given time, to allow for error checking or to even more substantially reduce the need for maintenance, as might be desired, for example, in nuclear reactors or oil or gas pipelines in remote and hard to reach areas.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A flowmeter for measuring the flow velocity of a fluid in a conduit, the flowmeter comprising:
    a bluff body configured to generate periodic disturbances in the fluid as the fluid flows past the bluff body;
    a light beam downstream of the bluff body and directed such that any periodic disturbances in the fluid flow pass through the light beam;
    a lenslet positioned such that the focal point of the light beam hits a first position on the lenslet after passing through the fluid flow, wherein the periodic disturbances in the fluid flow move the focal point of the light beam away from the first position; and
    a signal generator configured to translate the movement of the focal point into a detectable electrical signal.

2. The flowmeter of claim 1 wherein the lenslet comprises a light transmission gradient.

3. The flowmeter of claim 2 wherein the first position correlates with a completely opaque region of the light transmission gradient.

4. The flowmeter of claim 2 wherein the first position correlates with a completely clear region of the light transmission gradient.

5. The flowmeter of claim 2 wherein the light transmission gradient is a circular outwardly radiating gradient.

6. The flowmeter of claim 2 wherein the signal generator is a photovoltaic cell configured to detect a refraction phase shift caused by the movement of the focal point from one region of the light transmission gradient to another region of the light transmission gradient.

7. The flowmeter of claim 6 further comprising a diffusion medium positioned between the lenslet and the photovoltaic cell.

8. The flowmeter of claim 1 wherein the light beam is generated by a laser diode.

9. The flowmeter of claim 1 wherein the bluff body is a cylinder.

10. The flowmeter of claim 9 wherein the periodic disturbances are vortices.

11. The flowmeter of claim 1 wherein the bluff body is heated.

12. A method for measuring the flow velocity of a fluid flowing through a conduit, the method comprising:
    directing the fluid past a bluff body positioned and shaped such that periodic disturbances in the fluid are generated and shed off the bluff body at a rate known to be correlated to the flow velocity of the fluid; and
    detecting shedding of the periodic disturbances off of the bluff body with a light beam downstream of the bluff body and positioned so as to pass through the fluid flow in a direction generally perpendicular to the direction of fluid flow, wherein the focal point of the light beam hits a first position on a lenslet when the light beam is not perturbed by a periodic disturbance in the fluid flow and the light beam moves away from the first position when it is perturbed by a periodic disturbance in the fluid flow.

13. The method of claim 12 wherein the lenslet comprises a light transmission gradient and a first amount of light from the light beam is transmitted through the lenslet when the light beam hits the first position on the lenslet and a second, different, amount of light from the light beam is transmitted through the lenslet when the light beam moves away from the first position.

14. The method of claim 13 wherein the first amount of light transmitted through the lenslet is equivalent to all the light hitting the lenslet.

15. The method of claim 13 wherein the first amount of light transmitted through the lenslet is zero.

16. The method of claim 13 further comprising generating a detectable signal based on the amount of light transmitted through the lenslet.

17. The method of claim 16 wherein the detectable signal is generated by a photovoltaic cell.

* * * * *